United States Patent
Tanaka

(10) Patent No.: US 9,060,083 B2
(45) Date of Patent: Jun. 16, 2015

(54) IMAGE FORMING DEVICE, AND METHOD OF MANAGING DATA

(75) Inventor: Hiroyuki Tanaka, Fukuoka (JP)

(73) Assignee: RICOH COMPANY, LTD., Tokyo (JP)

( * ) Notice: Subject to any disclaimer, the term of this patent is extended or adjusted under 35 U.S.C. 154(b) by 715 days.

(21) Appl. No.: 12/711,317

(22) Filed: Feb. 24, 2010

(65) Prior Publication Data

US 2010/0231945 A1  Sep. 16, 2010

(30) Foreign Application Priority Data

Mar. 10, 2009 (JP) ................................. 2009-057011

(51) Int. Cl.
| | |
|---|---|
| G06F 3/12 | (2006.01) |
| G06K 15/00 | (2006.01) |
| H04N 1/40 | (2006.01) |
| B41C 1/02 | (2006.01) |
| H04N 1/00 | (2006.01) |
| H04N 1/32 | (2006.01) |

(52) U.S. Cl.
CPC ......... *H04N 1/00408* (2013.01); *H04N 1/0044* (2013.01); *H04N 1/00503* (2013.01); *H04N 1/32358* (2013.01); *H04N 1/32561* (2013.01); *H04N 2201/0094* (2013.01); *H04N 2201/3288* (2013.01); *H04N 2201/3295* (2013.01); *H04N 2201/3297* (2013.01)

(58) Field of Classification Search
USPC .............. 358/1.9, 1.16, 1.14, 1.15, 1.13, 328; 400/61; 386/243
See application file for complete search history.

(56) References Cited

U.S. PATENT DOCUMENTS

| | | | |
|---|---|---|---|
| 6,872,015 B2 * | 3/2005 | Roosen et al. | 400/61 |
| 6,949,729 B1 * | 9/2005 | Ishikawa et al. | 219/702 |
| 7,230,731 B2 * | 6/2007 | Dan et al. | 358/1.14 |
| 7,777,904 B2 * | 8/2010 | Van Den Tillaart et al. | 358/1.15 |
| 7,783,970 B2 * | 8/2010 | Chikamura | 715/248 |
| 8,127,364 B2 * | 2/2012 | Koike et al. | 726/26 |
| 8,169,643 B2 * | 5/2012 | Yamada | 358/1.15 |
| 8,199,170 B2 * | 6/2012 | Mishima | 345/672 |
| 8,307,002 B2 * | 11/2012 | Ooba | 707/784 |

(Continued)

FOREIGN PATENT DOCUMENTS

| | | |
|---|---|---|
| JP | 2002-207399 | 7/2002 |
| JP | 2005-269439 | 9/2005 |

(Continued)

OTHER PUBLICATIONS

Japanese Office Action dated Feb. 5, 2013.

*Primary Examiner* — Akwasi M Sarpong
(74) *Attorney, Agent, or Firm* — IPUSA, PLLC

(57) ABSTRACT

An image forming device executes a plurality of applications, and includes a scan controlling unit configured to instruct an image reading unit to read image data, and store the image data in an image data storage unit according to a request from the application; a display data generating unit configured to generate a display data of the image data stored in the image data storage unit, and store the display data in a display image data storage unit according to the request from the application, the display image data storage unit being inaccessible from the application; a display controlling unit configured to display the display data in a display unit according to the request from the application; and a deleting unit configured to delete the display data from the display data storage unit in response to a termination notice of use of the display data from the application.

19 Claims, 12 Drawing Sheets

(56) References Cited

U.S. PATENT DOCUMENTS

| | | | |
|---|---|---|---|
| 8,335,869 B2* | 12/2012 | Koike et al. ................... | 710/15 |
| 2003/0072023 A1* | 4/2003 | Tanaka ........................ | 358/1.13 |
| 2003/0074373 A1* | 4/2003 | Kaburagi et al. ........... | 707/104.1 |
| 2003/0107756 A1* | 6/2003 | Dan et al. .................... | 358/1.14 |
| 2003/0167264 A1* | 9/2003 | Ogura et al. ................. | 707/3 |
| 2003/0217240 A1* | 11/2003 | Satomi et al. ................ | 711/161 |
| 2004/0128270 A1* | 7/2004 | Bachman et al. ............ | 707/1 |
| 2004/0139052 A1* | 7/2004 | Kazushige et al. .......... | 707/1 |
| 2004/0174561 A1* | 9/2004 | Fukunaga et al. ........... | 358/1.15 |
| 2005/0226641 A1 | 10/2005 | Ando et al. | |
| 2006/0103666 A1* | 5/2006 | Kita ............................ | 345/619 |
| 2007/0077925 A1* | 4/2007 | Hiyama ....................... | 455/420 |
| 2007/0081189 A1* | 4/2007 | Kamei et al. ................ | 358/1.18 |
| 2008/0024592 A1* | 1/2008 | Bang et al. .................. | 348/14.02 |
| 2008/0091065 A1* | 4/2008 | Oshima et al. ............... | 600/109 |
| 2008/0238948 A1* | 10/2008 | Mishima ...................... | 345/672 |
| 2008/0281873 A1* | 11/2008 | Muroi .......................... | 707/200 |
| 2009/0024771 A1* | 1/2009 | Koike et al. ................. | 710/18 |
| 2009/0067805 A1* | 3/2009 | Kuroda et al. ............... | 386/46 |
| 2009/0210688 A1* | 8/2009 | Kohiga ........................ | 713/1 |
| 2009/0296136 A1 | 12/2009 | Tanaka | |
| 2010/0231945 A1* | 9/2010 | Tanaka ........................ | 358/1.13 |
| 2010/0277754 A1* | 11/2010 | Arimura et al. .............. | 358/1.9 |

FOREIGN PATENT DOCUMENTS

| | | |
|---|---|---|
| JP | 2005-269619 | 9/2005 |
| JP | 2009-290464 | 12/2009 |

* cited by examiner

IMAGE FORMING DEVICE, AND METHOD OF MANAGING DATA

BACKGROUND OF THE INVENTION

1. Field of the Invention

The present invention relates to an image forming device, and a method of managing data, and more specifically, to an image forming device generating display data of scanned image, and a method of managing data.

2. Description of the Related Art

Recently, an image forming device called a combination machine includes a platform for operating many kinds of applications, and an API (Application Program Interface) of the platform has been published (for example, see Japanese Laid-Open Patent Publication No. 2005-269619). The platform controls the image forming device according to a request from the application via the API, and provides a resulting product to the application. According to the image forming device, efficiency of an application development can be increased because functions which are commonly implemented in the platform can be used via the API.

One of the products that result from a process performed by the platform according to the request from the application is scanned data (hereinafter called, scanned image). A device to be built into a main unit such as an image forming device has a severe limitation as to a resource such as a memory device as compared to a computer for regular use. Therefore, with respect to a product such as the scanned image, which requires a large amount of memory, it is ideal to manage a lifecycle at the platform to prevent a shortage of the resource (storage capacity) due to an accumulation of unnecessary scanned images.

However, there are a number of purposes of the scanned images according to the functions of the applications. It is very difficult to manage the lifecycle at the platform. In other words, when the lifecycle is managed at the platform, utility of the platform is undermined, so that the functions that the application can provide are limited. Therefore, the scanned images are normally managed by the application.

The applicant has been attempting to implement a function of generating a display image in the platform. Here, the display image is generated as a display image data for an operation panel in the image forming device in order for a user to confirm a state of the scanned image. By implementing the function of generating the display image in the platform, each of the applications can easily provide a preview function of the scanned image.

The product of the function of generating the display image is, of course, a display image. Here, in view of the utility of the platform, it would be appropriate to manage the display image by the application.

On the other hand, use of the display image is very limited to displaying on the operation panel as opposed to the scanned image. Therefore, if a proper system can be developed, it is possible to somewhat manage the lifecycle of the display image at the platform.

In view of such problems, an objective of the present invention is to provide an image forming device properly managing the image data for displaying the scanned image data, and to provide a method of managing the data.

SUMMARY OF THE INVENTION

Accordingly, embodiments of the present invention may provide a novel and useful image forming device, and a method of managing data solving one or more of the problems discussed above.

One aspect of the present invention may provide an image forming device having an image reading unit, an image data storage unit, a display data storage unit, and a display unit, and performing a plurality of applications, the image forming device including: a scan controlling unit configured to instruct the image reading unit to read image data, and store the image data in the image data storage unit according to a request from the application; a display data generating unit configured to generate a display data of the image data stored in the image data storage unit, and store the display data in the display image data storage unit according to the request from the application, said display image data storage being inaccessible from the application; a display controlling unit displaying the display data in the display unit according to the request from the application; and a deleting unit configured to delete the display data from the display data storage unit in response to a termination notice of use of the display data sent from the application.

Another aspect of the present invention may be to provide a method of managing data using an image forming device executing a plurality of applications and having an image reading unit, an image data storage unit, a display data storage unit, and a display unit, the method including the steps of: instructing the image reading unit to read image data, and storing the image data in the image data storage unit according to a request from the application; generating display data corresponding to the image data stored in the image data storage unit, and storing the display data in the display data storage unit according to the request from the application, said display data storage unit being inaccessible from the application; displaying the display data on the display unit according to the request from the application; and deleting the display data from the display data storage unit in response to a termination notice of use of the display data sent from the application.

Additional objects and advantages of the embodiments will be set forth in part in the description which follows, and in part will be obvious from the description, or may be learned by practice of the invention. The objects and advantages of the invention will be realized and attained by means of the elements and combinations particularly pointed out in the appended claims.

It is to be understood that both the foregoing general description and the following detailed description are exemplary and explanatory only and are not restrictive of the invention as claimed.

DETAILED DESCRIPTION OF THE PREFERRED EMBODIMENTS

A description is given below, with reference to FIG. 1 through FIG. 12 of embodiments of the present invention.

Figure 1:
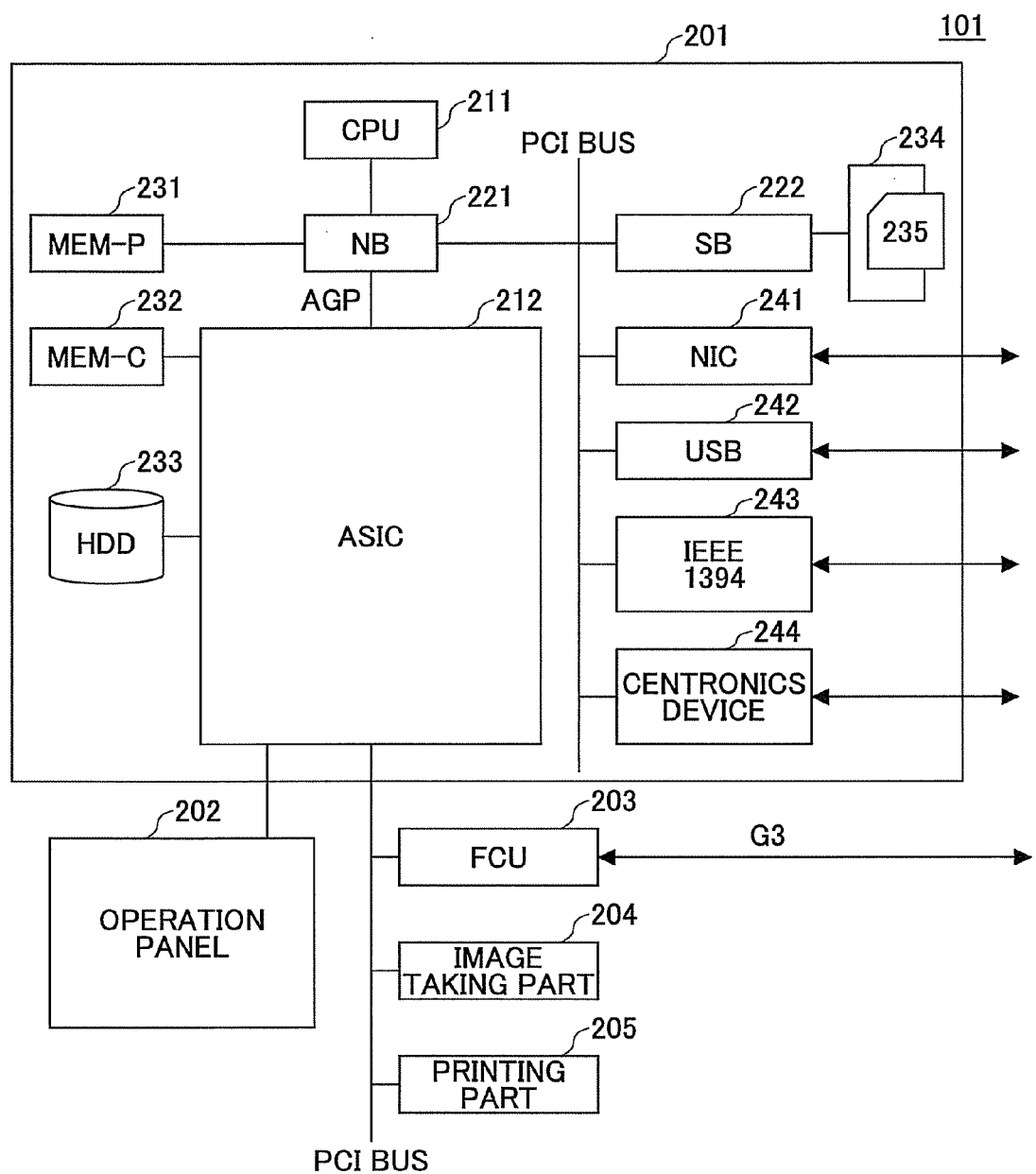
FIG. 1 is a drawing for showing a hardware structure of a combination machine according to an embodiment of the present invention.

Preferred embodiments of the present invention are explained with reference to the drawings, as follows. First, FIG. 1 is a drawing for showing hardware structure of a combination machine according to an embodiment of the present invention. In FIG. 1, a combination machine 101 has hardware including a controller 201, an operation panel 202, a facsimile control unit (FCU) 203, an image taking part 204, and a printing part 205.

The controller 201 includes a CPU 211, an ASIC 212, a NB 221, a SB 222, a MEM-P 231, a MEM-C 232, a HDD (Hard disk drive) 233, a memory card slot 234, a NIC (Network interface controller) 241, a USB device 242, an IEEE1394 device 243, and a centronics device 244.

The CPU 211 is an IC for processing various information. The ASIC 212 is an IC for processing various images. The NB 221 is a north bridge of the controller 201. The SB 222 is a south bridge of the controller 201. The MEM-P 231 is a system memory of the combination machine 101. The MEM-C 232 is a local memory of the combination machine 101. The HOD 233 is a storage device of the combination machine 101. The memory card slot 234 is a slot for setting the memory card 235. The NIC 241 is a controller for a network communication by a MAC address. The USB device 242 is a device for providing a connection terminal of a USB standard. The IEEE1394 device 243 is a device for providing a connection terminal of an IEEE1394 standard. The centronics device is a device for providing a connection terminal of a centronics type.

The operation panel 202 is hardware (operation part) for an operator to input instructions in the combination machine 101, and also functions as hardware (display part) for the operator to obtain an output from the combination machine 101. The image taking part 204 is hardware for obtaining an image (image data) from an original to be read. The printing part 205 is hardware for printing the image onto a printing paper. Incidentally, an image forming apparatus according to the present invention is not limited to a combination machine as long as it is able to execute a scan feature.

Figure 2:
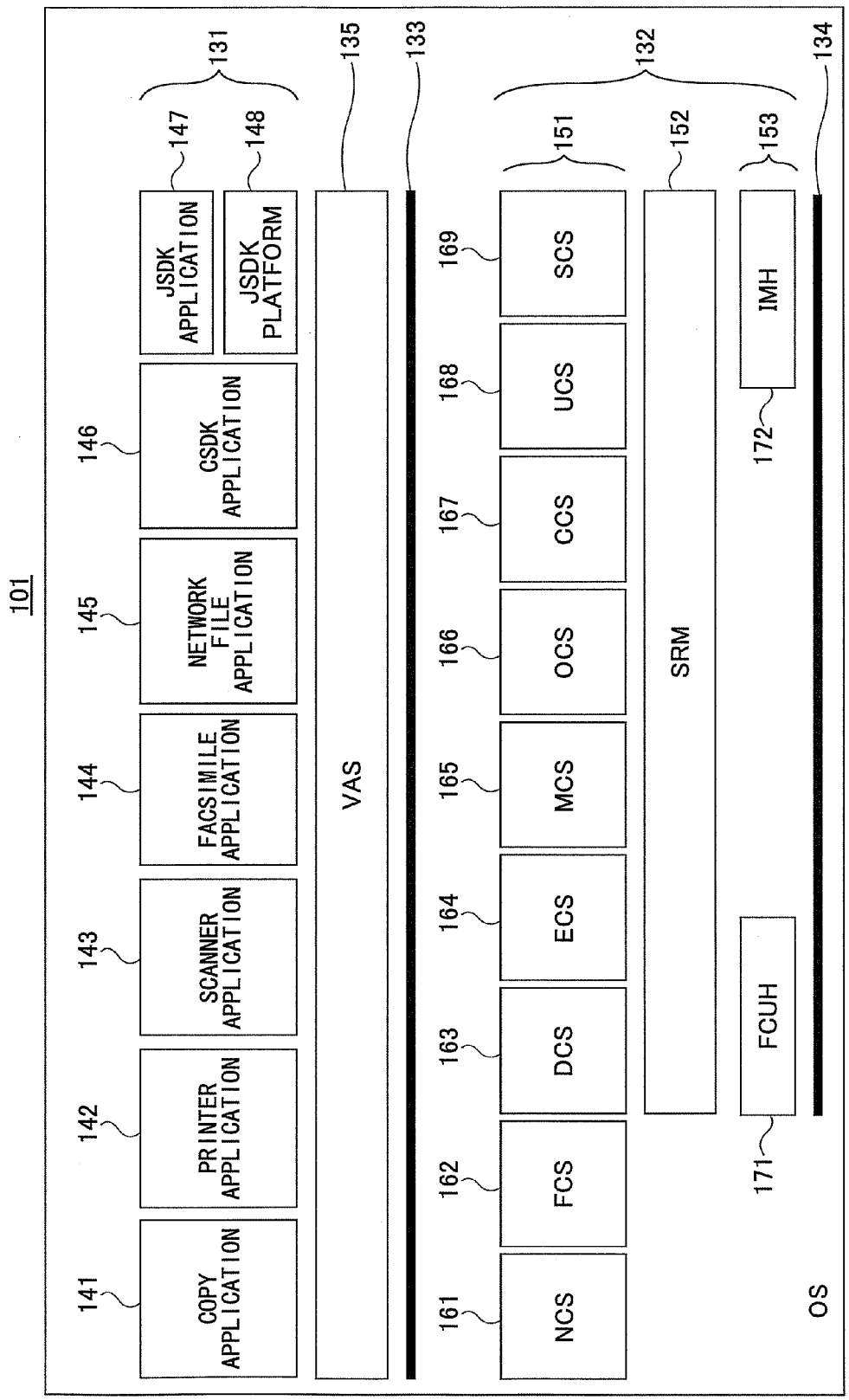
FIG. 2 is a drawing for showing a software structure of the combination machine according to the embodiment of the present invention.

FIG. 2 is a drawing for showing a software structure of the combination machine according to the embodiment of the present invention. In FIG. 2, a program provided to the combination machine 101 is roughly divided into an application 131 and a platform 132. These programs are executed simultaneously on a process basis by means of an OS such as UNIX (registered trademark).

As the application 131, there are provided a copy application 141 which is an application used for copying, a printer application 142 which is an application used for a printer, a scanner application 143 which is an application for a scanner, a facsimile application 144 which is an application used for a facsimile machine, and a network file application 145 which is an application used for a network file.

The application 131 can be developed using a particular type of software development kit (SDK). The application 131 developed using the SDK is referred to as an SDK application. As for the particular type of SDK, there are provided "CSDK", which is used for developing the application 131 according to C language and "JSDK", which is used for developing the applications according to JAVA (registered trademark). Each application 131 developed using the CSDK is referred to as a CSDK application, and each application 131 developed using the JSDK is referred to as a JSDK application. The application 131 of the combination machine 101 of FIG. 2 includes a CSDK application 146 and a JSDK application 147 as well. The combination machine 101 of FIG. 2 further includes a JSDK platform 148 as software for mediating between the JSDK application 147 described in the JAVA (registered trademark) language, and another software application described in the C language. Namely, the JSDK platform 148 is a platform having an API (Application Program Interface) for providing features that are provided by a control service 151 or the like to the JSDK application 147. In other words, the JSDK platform 147 is a way to provide common features to a plurality of the JSDK applications 147.

As the platform 132, there are provided control service 151 including various kinds of control service, a system resource manager (SRM) 152 and a handler 153. As the control service 151, there are provided a network control service (NCS) 161, a facsimile control service (FCS) 162, a delivery control service (DCS) 163, an engine control service (ECS) 164, a memory control service (MCS) 165, an operation panel control service (OCS) 166, a certification control service (CCS) 167, a user directory control service (UCS) 168, and a system control service (SCS) 169. As the handlers 153, there are provided a facsimile control unit handler (FCUH) 171 and an image memory handler (IMH) 172.

The process of the NCS 161 mediates network communication. The process of the FCS 162 provides the API of a facsimile. The process of the DCS 163 performs a control with respect to distribution processing of accumulated documents. The process of the ECS 164 performs a control of the image taking part 204 and a printing part 205. The process of the MCS 165 performs a control with respect to memories and a hard disk drive. The process of the CCS 166 performs a control with respect to the operation panel. The process of the CCS 167 performs a control with respect to an authentication process or a billing process. The process of the UCS 168 performs a control with respect to management of user information. The process of the SCS 169 performs a control with respect to management of the system.

The SRM 152 manages a hardware resource to mediate an acquisition request from a control service layer. The FCUH 171 requests the hardware resource to perform a facsimile process to. The IMH 172 assigns a memory to a process and manages the memory assigned to the process.

There is provided a virtual application service (VAS) 135 as software mediating between the application 131 and the platform 132. The VAS 135 operates as a server process, which sets the application 131 as a client, and also serves as a client process, which sets the platform 132 as a server. The VAS 135 is provided with a wrapping function to mask the platform 132 when viewing from the application 131 in order to play a role to compensate for a version difference associated with an upgrade of a version.

Figure 3:
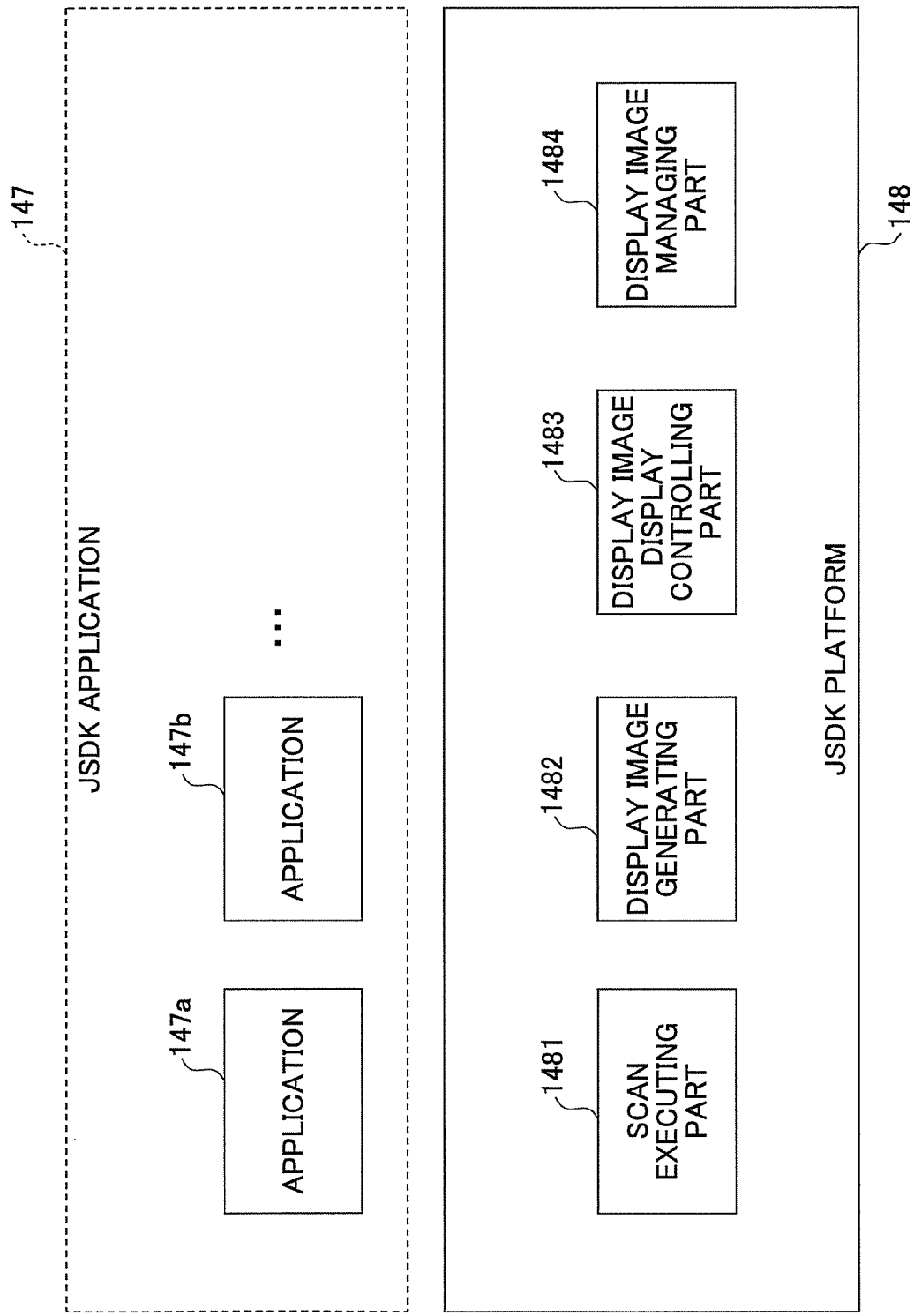
FIG. 3 is a drawing for showing a functional structure of a JSDK platform according to a first embodiment of the present invention.

FIG. 3 is a drawing for showing a functional structure of a JSDK platform according to a first embodiment of the present invention. In FIG. 3, the JSDK platform 148 includes a scan executing part 1481, a display image generating part 1482, a display image display controlling part 1483, and a display image managing part 1484.

The scan executing part 1481 makes the image taking part 204 scan image data from the original by the ECS 164 in response to the request from the JSDK application 147, and further provides the scanned image data (hereinafter called scanned image) to the JSDK application 147.

The display image generating part 1482 generates image data for a preview image of the scanned image or a display of a thumbnail (hereinafter, display image). For example, in a case where the scanned image is in TIFF (Tagged Image File Format) and the display image is in JPEG (Joint Photographic Experts Group) format, the image generating part 1482 transforms the image from the TIFF to the JPEG format.

The display image display controlling part 1483 controls a process to display the display image in the operation panel 202.

The display image managing part 1484 manages a lifecycle or the like of the display image.

Also, in FIG. 3, as the JSDK application 147, an application 147a and an application 147b are exemplified. Each of the applications 147a and 147b performs a different job. However, these applications are common in a sense that both of the applications deal with the scanned image and the display image. For example, the application 147a scans image data from the original and transmits the scanned image. The application 147a displays the display image in the operation panel 202 and asks a user if the user wants to transmit the scanned image before transmitting the scanned image. The application 147b scans image data from the original, and prints the scanned image (that is, a copy job). The application 147b displays the scanned image in the operation panel 202 and asks the user if the user wants to print the scanned image before printing the scanned image.

Subsequently, a storage area for managing (storing) the scanned image and the display image of the combination machine 101 is illustrated.

Figure 4:
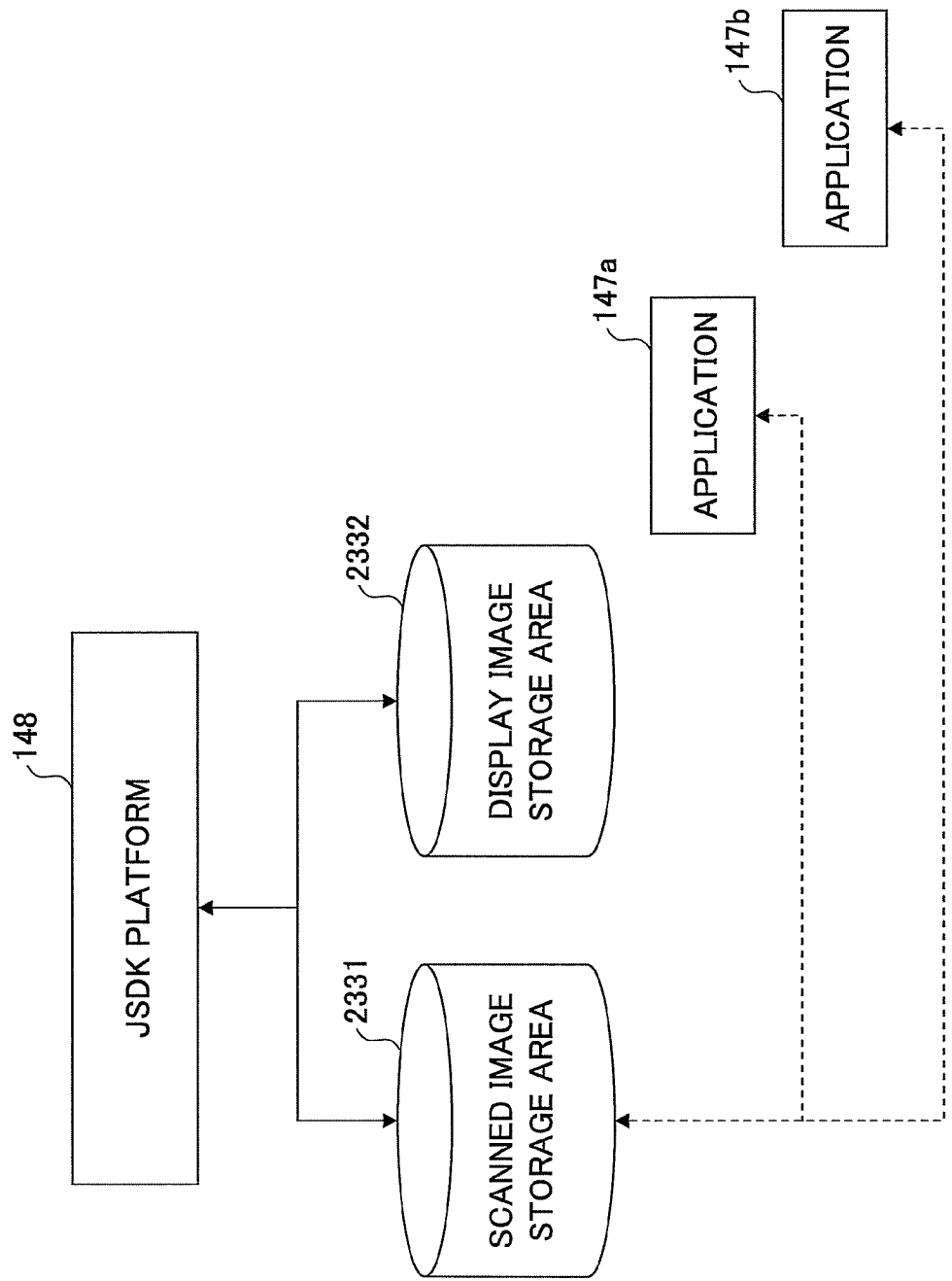
FIG. 4 is a drawing for showing a storage area for managing image data in the combination machine according to the first embodiment of the present invention.

FIG. 4 is a drawing for showing a storage area for managing image data in the combination machine according to the first embodiment of the present invention. In FIG. 4, a scanned image storage area 2331 and a display image storage area 2332 are shown. These storage areas are parts of the HDD 233. For example, they are partitioned by directories or folders.

The scanned image storage area 2331 is a storage area (database) for storing the scanned image. The display image storage area 2332 is a storage area for storing the display image managed by the JSDK platform 148.

Each of lines in between the JSDK platform 148, each of the storage areas, and the application 147a or the application 147b indicates an existence of a right of access to each of the storage areas. Namely, the JSDK platform 148 has access to all of the storage areas. On the other hand, the JSDK application 147 such as the applications 147a and 147b has access only to the scanned image storage area 2331. Here, the access to the scanned image storage area by each of the JSDK applications 147 is limited to the scanned image data that belongs to the JSDK applications 147. This means that the scanned image data is requested by the JSDK application 147. In FIG. 4, such limitation is indicated by broken lines between the each of the JSDK applications 147 and the scanned image storage area 2331.

Incidentally, a control of access to the storage area may be performed by a system provided by an OS or the like.

Figure 5:
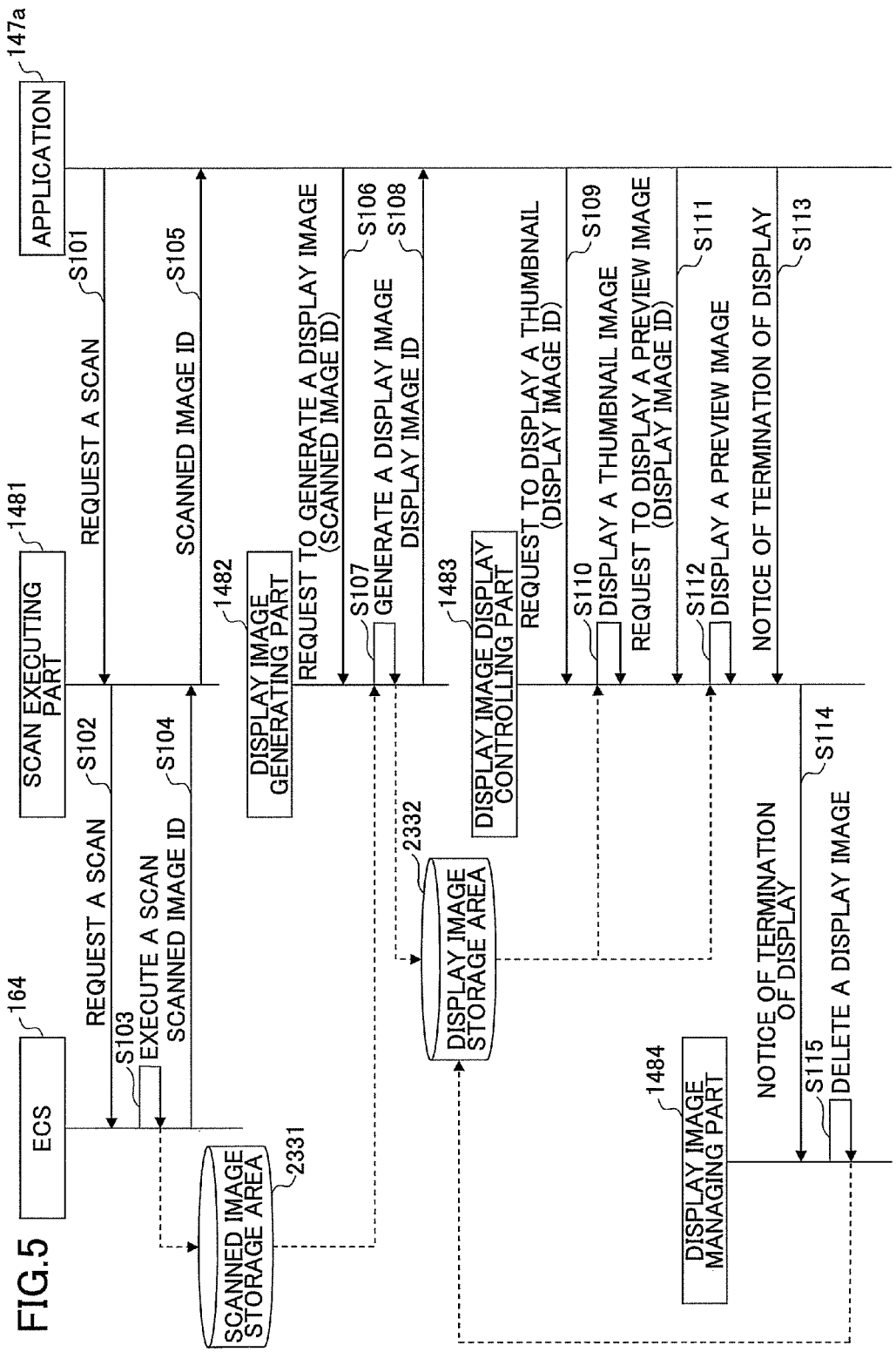
FIG. 5 is a drawing for showing procedures performed by the combination machine according to the first embodiment of the present invention.

Hereinafter, procedures performed by the combination machine 101 according to the first embodiment are explained. FIG. 5 is a sequence drawing for showing the procedures performed by the combination machine according to the first embodiment.

In Step S101, the application 147a, after receiving an instruction to start a job from a user, makes a request to scan to the scan executing part 1481. In response to the request, the scan executing part 1481 makes a request to scan the original to the ECS 164 (S102). In response to the request, the ECS 164 makes the image taking part 204 read an image from the original, and stores the scanned image in the scanned image storage area 2331 (S103). Subsequently, the ECS 164 returns an identifier (scanned image ID) of the scanned image stored in the scanned image storage area 2331 to the scan executing part 1481 (S104). The scan executing part 1481 then returns the scanned image ID to the application 147a (S105).

Next, the application 147a specifies the scanned image ID, and makes a request to display the display image corresponding to the scanned image to the display image generating part 1482 (S106). In response to the request, the display image generating part 1482 obtains the scanned image corresponding to the scanned image ID from the scanned image storage area 2331, and generates the display image corresponding to the scanned image (S107). The generated display image associated with a date and a time of creation is stored in the display image storage area 2332 by the display image generating part 1482. Subsequently, the display image generating part 1482 returns the identifier of the generated display image (display image ID) to the application 147a (S108). When the scanned image has multiple pages (that is, when multiple pages of originals are scanned) a plurality of display images is generated. In this case, a plurality of identifiers of the display images is returned to the application 147a. Incidentally, the display image ID may be a value to indicate a relationship with the scanned image. For example, the scanned image ID and the display image ID corresponding to the scanned image may be the same value. Alternatively, the scanned image ID and the display image ID corresponding to the scanned image have a common identifier and end portions different from each other (extension or the like). In this embodiment, for the sake of explanation, the image data corresponding to the ID is identifiable (e.g., a file name) even when the storage area is changed.

Next, the application 147a requests the display image display controlling part 1483 to display a thumbnail of the display image data (S109). At this time, a display image ID of a display image which is subject to the thumbnail display is specified. In response to the request, the display image display controlling part 1483 creates thumbnails from the specified display image corresponding to the display image ID in the operation panel 202 among display images stored in the display image storage area 2332 (S110). To be specific, a thumbnail of a list of display images is displayed in the operation panel 202.

In this state, for example, when one of the display images displayed as thumbnails is chosen by the user, the application 147a requests a preview to the display image display controlling part 1483, specifying the display image ID (S111). In response to the request, the display image display controlling part 1483 displays the preview of the display image corresponding to the specified display image ID in the operation panel 202 (S112). For example, a small display image is enlarged. Therefore, the user may be able to confirm a quality of the scanned image.

Incidentally, the steps of S109-S111 are repeatedly performed. Namely, the preview returns to the thumbnail, and a preview of different display image is performed thereafter.

Subsequently, the application 147*a* sends a notice of termination of display image (termination of use of the display image) to the display image display controlling part 1483 in response to an instruction from the user via the operation panel 202 (S113). Incidentally, the instruction from the user, like an instruction to send the scanned image, is such as to determine whether the preview or the thumbnail is not displayed afterwards.

In response to the notice of termination of display image, the display image display controlling part 1483 terminates the thumbnail and the preview when the display image is displayed as the thumbnail or the preview, and sends a notice of the termination of display image to the display image managing part 1484 (S114). In response to the notice, the display image managing part 1484 deletes all of the display images stored in the display image storage area 2332 (S115).

As described above, according to the combination machine 101 of the first embodiment, in response to the notice of termination of the display image from the JSDK application 147, the JSDK platform 148 deletes the display images. Accordingly, it is possible to avoid any consumption of storage area due to accumulation of unnecessary display images. Also, it is possible to avoid security problems for the display images due to the display images being left in a memory device for a long time.

Furthermore, each of the JSDK applications 147 cannot directly access the display image. Therefore, the security of the display image is further properly maintained.

Incidentally, the display image display controlling part 1483 may automatically terminate the thumbnail or the preview when a predetermined time (hereinafter called, a maximum display time) elapses after the thumbnail or the preview starts to be displayed, and notify the display image managing part 148 of the termination of the display image. In this case, the display image display controlling part 1483 records a time when the thumbnail or the preview is started in a memory (MEN-2231), and determines an elapsed time based on this start time.

Further, the display image managing part 1484 may automatically delete the display images from the display image storage area 2332 when a predetermined time (hereinafter called, a maximum storage time) elapses. Due to the limit of a storage period of the display image, even if the JSDK application 147 fails to send the notice of termination of the display image, the display image can be properly deleted. Incidentally, a time of generation of the display image may be determined based on a generation time associated with the display image.

Here, under an assumption that the display images are not simultaneously generated by a plurality of JSDK applications 147, all of the display images stored in the display image storage area 2332 are deleted when the notice of termination of the display image is received.

In a case where the display images may be generated by the plurality of the JSDK applications 147, the display image associated with the identifier of the JSDK application 147 may be stored in the display image storage area 2332, and only a display image associated with the JSDK application 147 which sends the notice of termination of display image may be deleted. In this way, even in a case where the display images are generated by two or more JSDK applications 147, a notice of termination of display image from one of the JSDK applications 147 does not delete the rest of display images corresponding to the other JSDK applications 147.

Next, a second embodiment of the present invention is explained. In the second embodiment, only aspects different from the first embodiment are explained. Accordingly, the second embodiment is the same as the first embodiment unless described otherwise.

Figure 6:
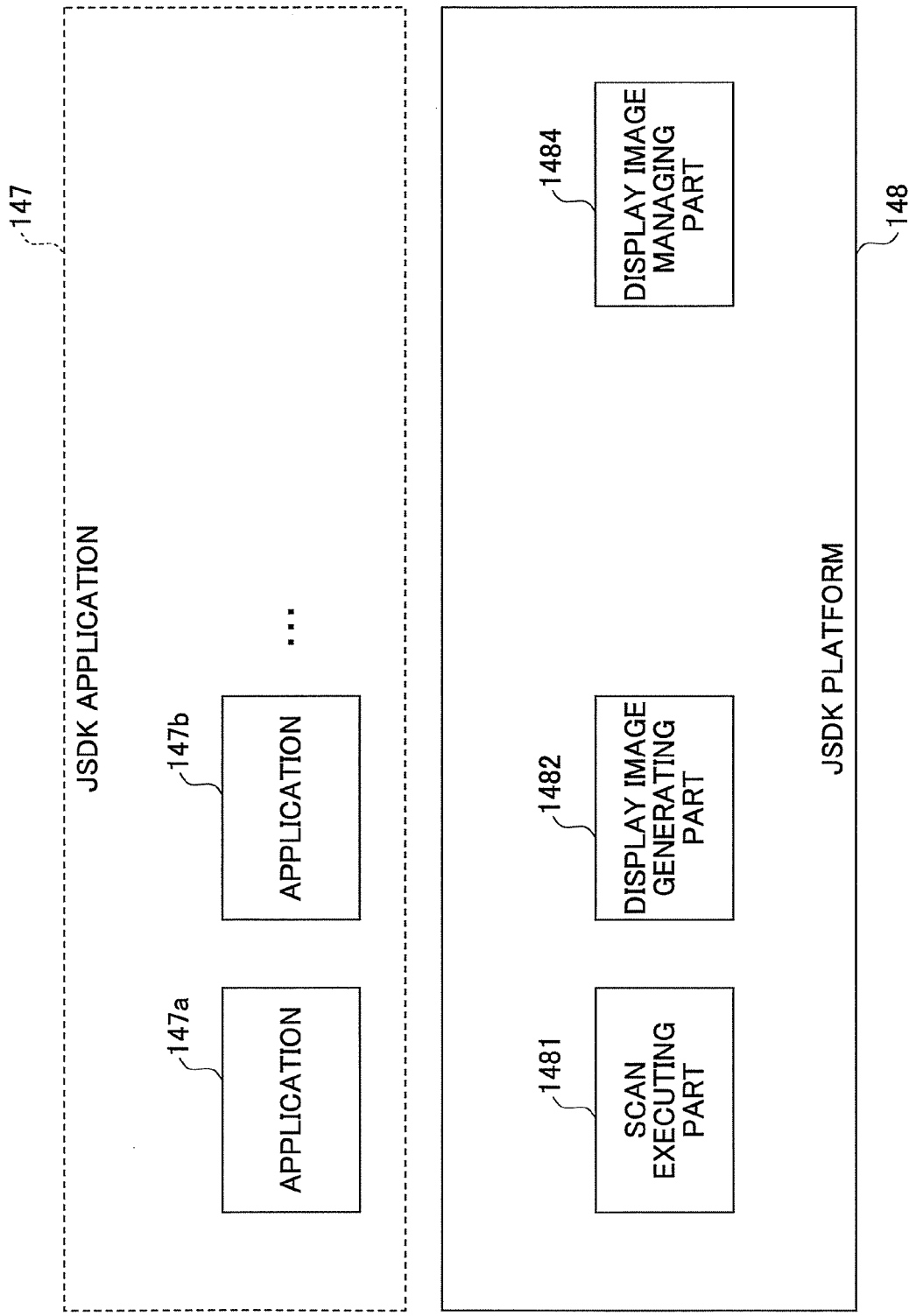
FIG. 6 is a drawing for showing a functional structure of a JSDK platform according to a second embodiment of the present invention.

FIG. 6 is a drawing for showing a functional structure of a JSDK platform according to the second embodiment of the present invention. In FIG. 6, parts that are the same as the parts in FIG. 3 are given the same reference numerals, and explanations thereof are omitted.

As shown in FIG. 6, a JSDK platform 148 of the second embodiment does not include a display image display controlling part 1483 (that is, a thumbnail feature or a preview feature is not provided). Therefore, in the second embodiment, it is required to have an implementation to display the thumbnail or the preview on a side of the JSDK application 147. Therefore, it is necessary for the JSDK application 147 to directly communicate with the display image.

Figure 7:
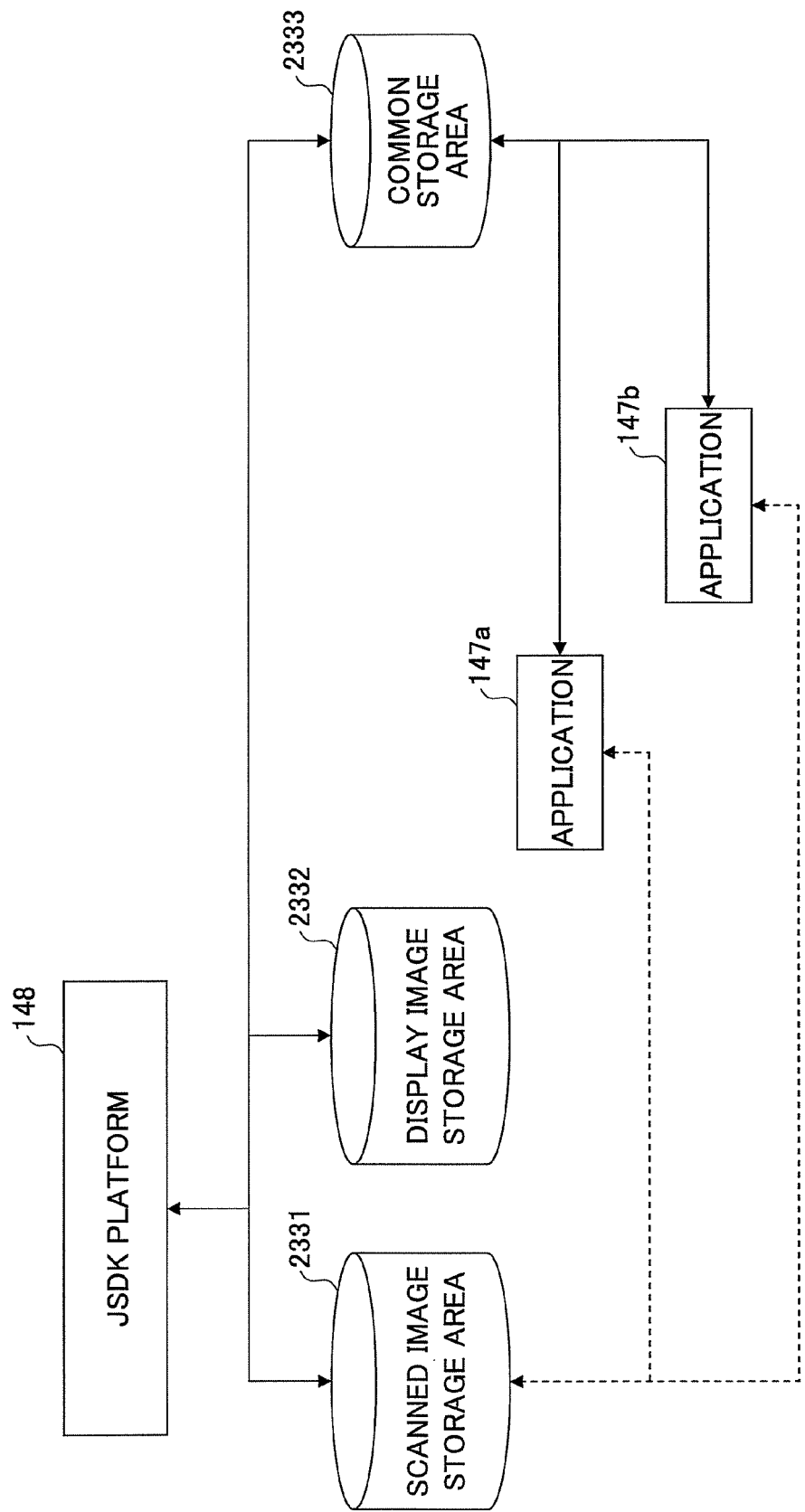
FIG. 7 is a drawing for showing a storage area for managing image data in a combination machine according to the second embodiment of the present invention.

FIG. 7 is a drawing for showing a storage area for managing image data in a combination machine according to the second embodiment of the present invention. In FIG. 7, parts that are the same as the parts in FIG. 4 are given the same reference numerals, and explanations thereof are omitted.

In the second embodiment, a common storage area 2333 is provided. The common storage area 2333 is a storage area to store image data commonly used by a plurality of JSDK applications 147. Therefore, the JSDK platform 148 and all of the JSDK applications 147 have access to the common storage area 1333.

Figure 8:
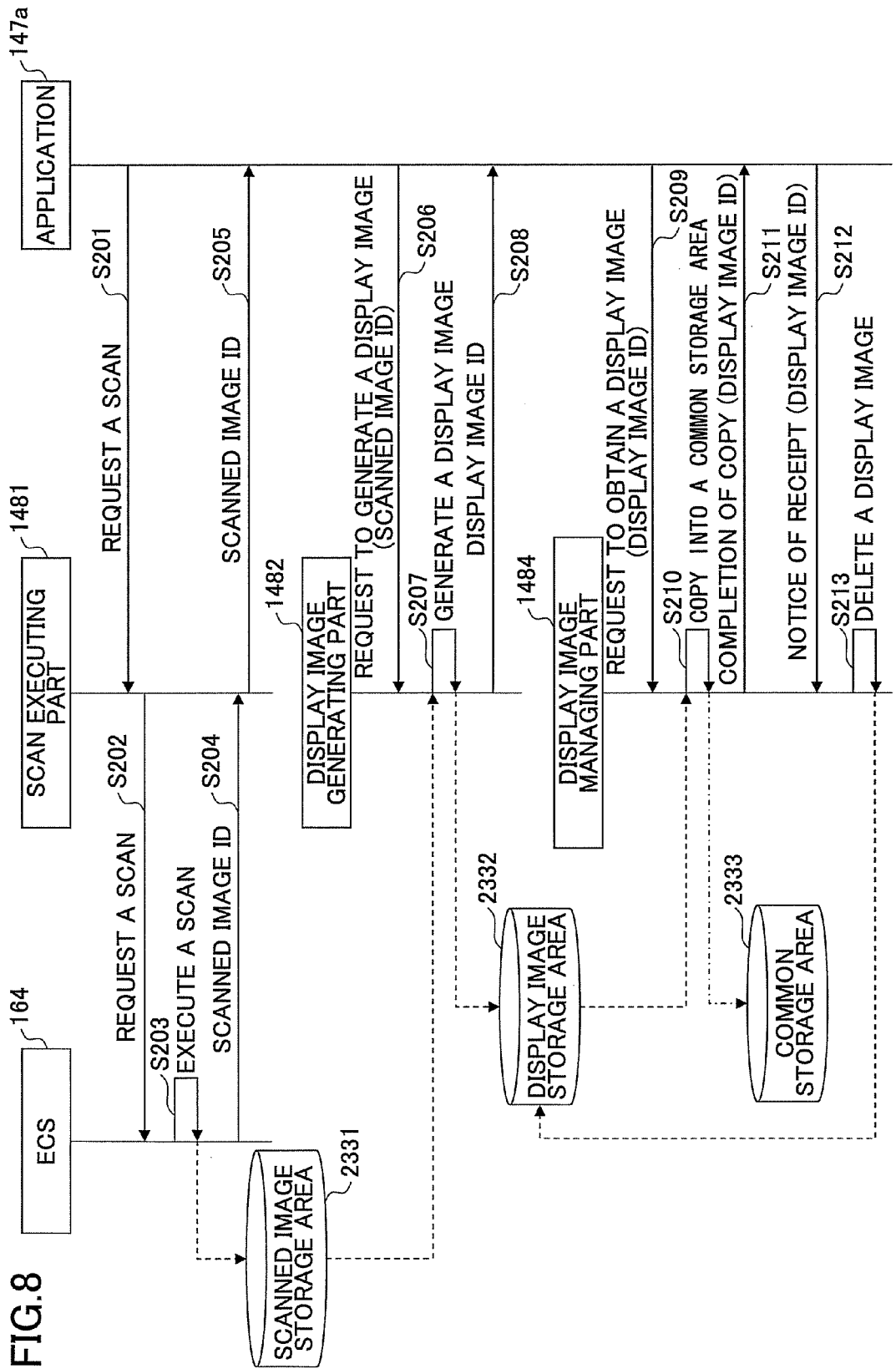
FIG. 8 is a drawing for showing procedures performed by the combination machine according to the second embodiment of the present invention.

Procedures performed by the combination machine according to the second embodiment are explained, as follows. FIG. 8 is a drawing for showing the procedures performed by the combination machine according to the second embodiment of the present invention.

In FIG. 8, steps S201-S208 are the same as the steps S101-S108 in FIG. 5.

After the step S208, the application 147*a* specifies a display image ID for a necessary display image, and requests the display image managing part 1484 to obtain the display image (S209). In response to the request, the display image managing part 1484 copies the display image corresponding to the specified display image ID in the display image storage area 2332 into the common storage area 2333 (S210). The display image managing part 1484 then notifies the application 147*a* of a completion of the copy (S211). The notice of completion may include the display image ID of the copied display image. In this way, when a part of the display images is copied, and it is so confirmed, the application 147*a* is notified of the successful completion of copying.

Subsequently, the application 147*a*, after confirming that the display image is copied into the common storage area 2333, notifies the display image managing part 1484 of the receipt of the display image (S212). The notice of the receipt may include the display image ID of the display image which is confirmed to be copied. In this way, when it is confirmed that only a part of the display image is copied, the user can be informed of such result.

In response to the confirmation of copying, the display image managing part 1484 deletes all of the display images stored in the display image storage area 2332 (S213). When the display image ID is included in the confirmation of copying, the display image corresponding to the display image ID is deleted.

As described above, according to the second embodiment of the present invention, at least in the storage area managed by the JSDK platform 148, the accumulation of unnecessary display images is avoided.

Furthermore, a timing to delete the display image and a usage of the display image depends on the application 147*a*. Therefore, as to the handling of the display image, flexibility is enhanced. For example, the display image may be utilized for purposes other than the thumbnail or the preview.

Incidentally, an example where the display image is copied in the step S210 is explained above. Alternatively, the display image may be transferred. In this case, the transferred display image is deleted from the display image storage area 2332. Therefore, a deleting process is not necessary in the step S213.

Also, the display image managing part 1484 may automatically delete the display image corresponding to an acquisition request from the display image storage area 2332 when a predetermined time elapses after the acquisition request of the display image is received. Furthermore, the display image may be automatically deleted when the maximum storage time has elapsed after the creation thereof. In this way, even if the JSDK application 147 does not perform an acquisition of the display image (S209), the display image in the display image storage area 2332 is properly deleted.

Next, a third embodiment of the present invention is explained. For the third embodiment, only aspects different from the second embodiment are explained. Accordingly, the second embodiment is the same as the second embodiment unless described otherwise.

Figure 9:
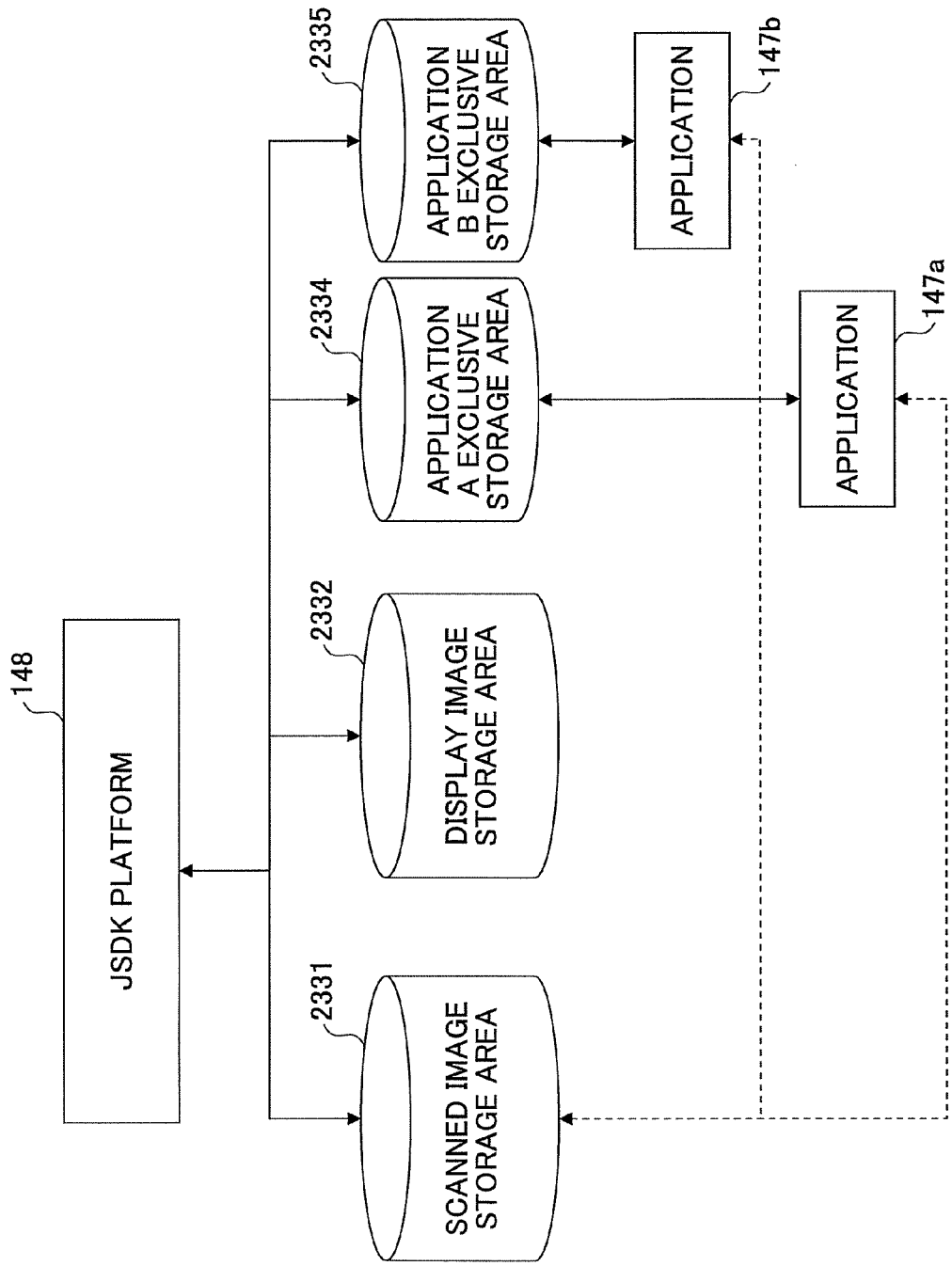
FIG. 9 is a drawing for showing a storage area for managing image data in a combination machine according to a third embodiment of the present invention.

FIG. 9 is a drawing for showing a storage area for managing image data in a combination machine according to the third embodiment of the present invention. In FIG. 9, parts that are the same as the parts in FIG. 7 are given the same reference numerals, and explanations thereof are omitted.

In the third embodiment, an application A exclusive storage area 2334 and an application B exclusive storage area 2335 are additionally provided. The application A exclusive storage area 2334 is a storage area for storing image data managed by the application 147*a* (regardless of whether the image data is the scanned image or the display image). The application B exclusive storage area 2335 is a storage area for storing image data managed by the application 147*b*. Only the JSDK platform 148 and the application 147*a* have access to the application A exclusive storage area 2334. Also, only the JSDK platform 148 and the application 147*b* have access to the application B exclusive storage area 2335. Incidentally, the common storage area 2333 is not necessary in the third embodiment.

Figure 10:
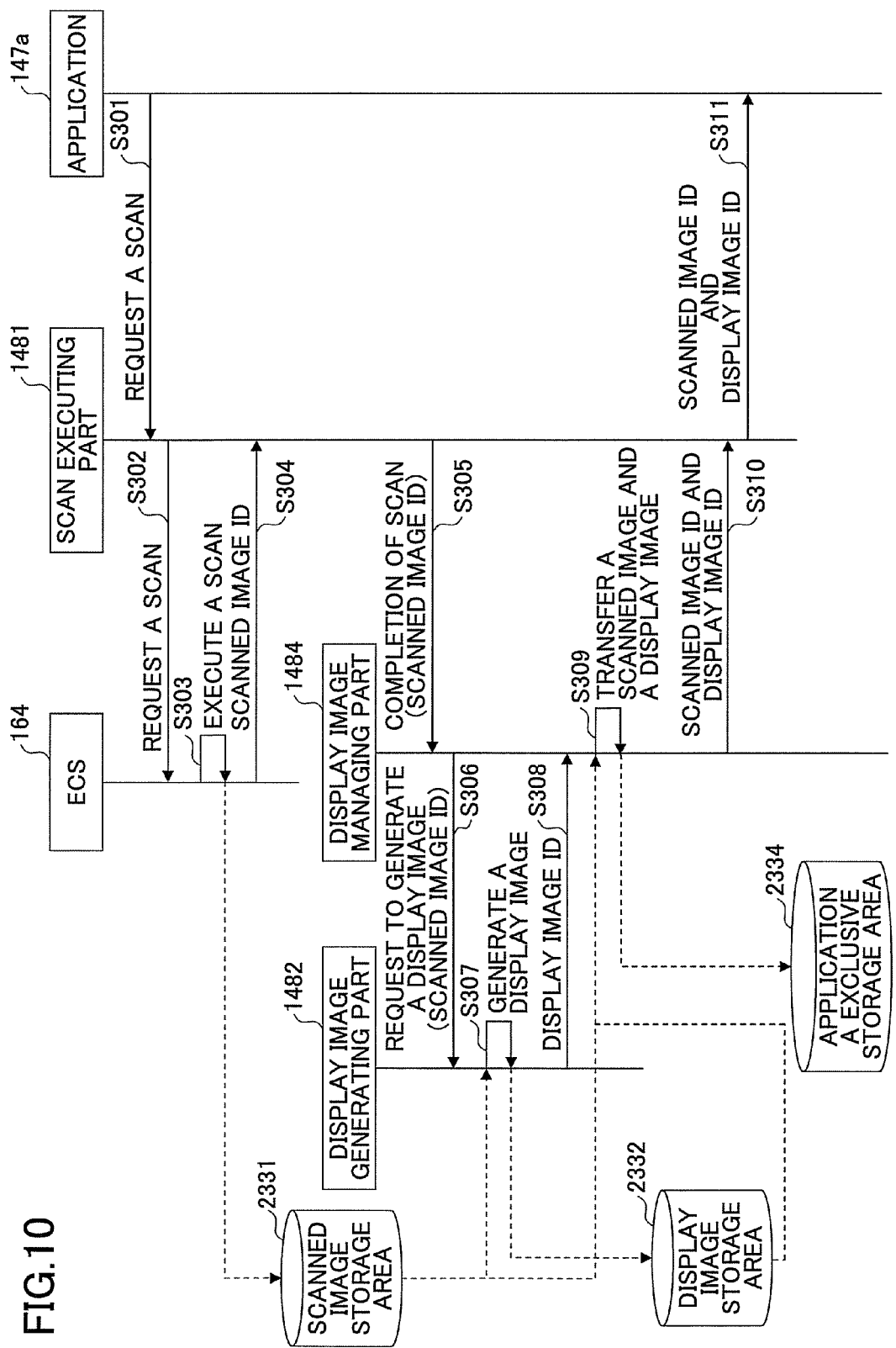
FIG. 10 is a drawing for showing procedures performed by the combination machine according to the third embodiment of the present invention.

Procedures performed by the combination machine according to the third embodiment are explained below. FIG. 10 is a drawing for showing procedures performed by the combination machine according to the third embodiment of the present invention.

In FIG. 10, the steps S301-S304 are the same as the steps S201-S204 in FIG. 8.

After the step S304, the scan executing part 1481 specifies a scanned image ID and notifies the display image managing part 1484 of a completion of the scan (S305). In response to the notice, the display image managing part 1484 specifies the scanned image ID and requests the display image generating part 1482 to generate the display image (S306). In response to the request, the display image managing part 1484 obtains the scanned image corresponding to the scanned image ID from the scanned image storage area 2331, and generates the display image corresponding to the scanned image (S307). The generated display image associated with a date of generation (generation date) by the display image generating part 1482 is stored in the display image storage area 2332. Subsequently, the display image generating part 1482 returns the display image ID of the generated display image to the display image managing part 1484 (S308).

Subsequently, the display image managing part 1484 transfers the scanned image stored in the scanned image storage area 2331 and corresponding to the scanned image ID which is notified in the step S305; and the display image stored in the display image storage area 2332 and corresponding to the display image ID which is notified in the step S308 to the application A exclusive storage area 2334 of the application 147*a* which originally requests the scan (S309). Accordingly, the image data subjected to the transfer is deleted from the scanned image storage area 2331 or the display image storage area 2332.

Incidentally, in order to identify the origin of the request of scan among the JSDK applications 147, for example, each of the JSDK applications 147 may be associated with a thread group. The display image managing part 1484 determines the origin of the request of scan among the JSDK applications 147 by confirming the thread group to which a thread that the display image managing part 1484 operates belongs. Alternatively, upon requesting the scan (S301), an identifier of the application 147 may be given to the scan executing part 1481, and, in the step S305, the identifier may be given to the display image managing part 1484 by the scan executing part 1481.

Subsequently, the display image managing part 1484 notifies the scan executing part 1481 of the scanned image ID and the display image ID of the transferred scanned image and the transferred display image, respectively (S310). The scan executing part 1481 returns the scanned image ID and the display image ID to the application 147*a* in response to the request of scan (S311). In this way, the application 147*a* is enabled use the scanned image and the display image.

In a case where the process shown in FIG. 10 is executed by the application 147*b*, the scanned image and the display image are stored in the application B exclusive storage area 2335.

As described above, according to the third embodiment of the present invention, the effects which are the same as those in the second embodiment can be obtained. Furthermore, since the scanned image and the display image are stored in an exclusive storage area corresponding to each of the applications 147, access from the other JSDK application 147 is prevented. Accordingly, it is possible to further enhance the security.

Incidentally, according to the third embodiment, the scanned image and the display image are stored in an identical storage area. Therefore, the scanned image ID and the display image ID corresponding to the scanned image ID may have a common identifier and end portions (extension or the like) different from each other.

Next, a fourth embodiment of the present invention is explained. As to the fourth embodiment, the functional structure of the JSDK platform 148 is shown in FIG. 6, and the storage area for storing the image data is shown in FIG. 9

Figure 11:
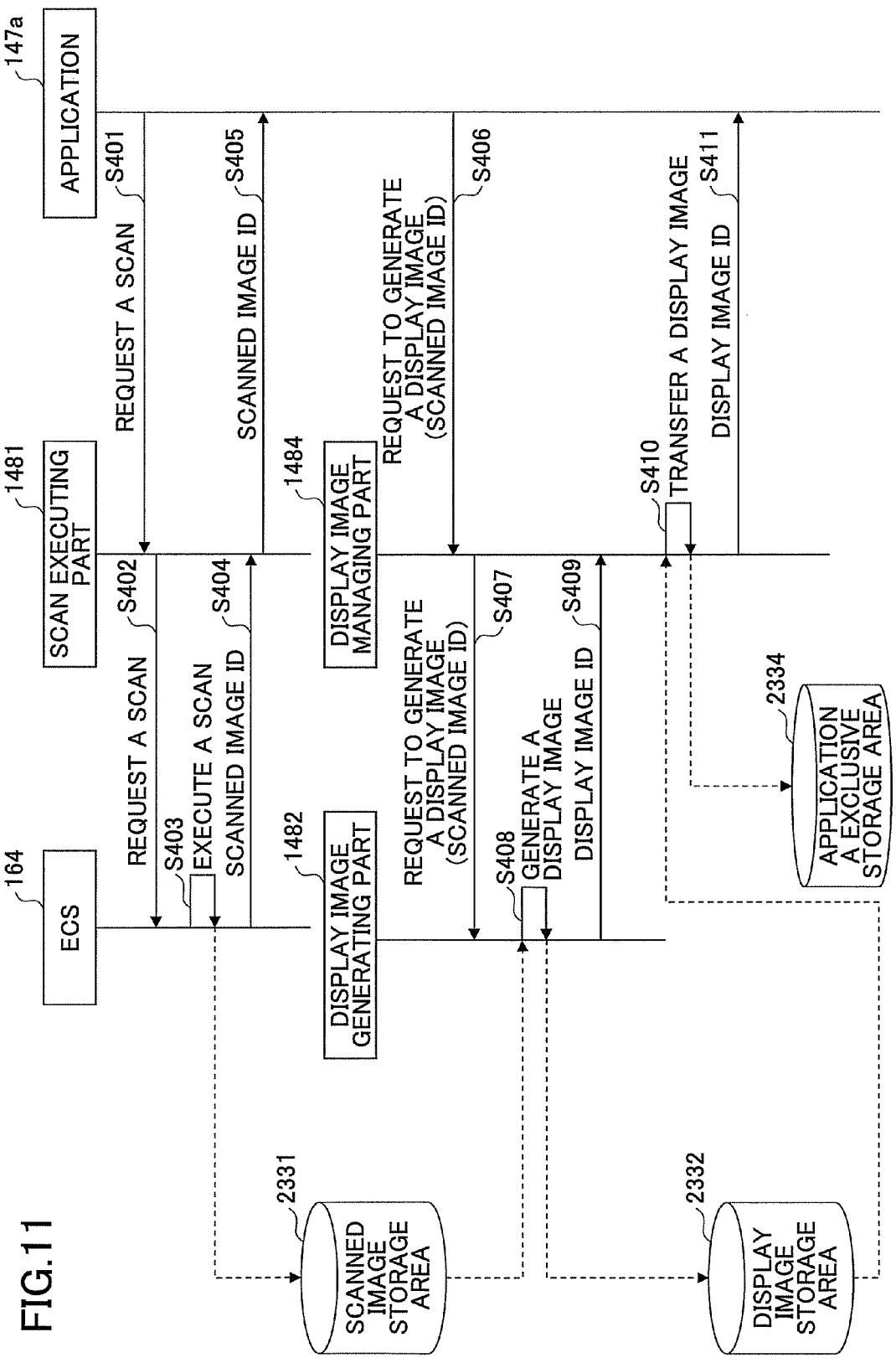
FIG. 11 is a drawing for showing procedures performed by a combination machine according to a fourth embodiment of the present invention.

FIG. 11 is a sequence drawing for showing procedures performed by a combination machine according to the fourth embodiment of the present invention. In FIG. 11, steps S401-S404 are the same as the steps S201-S205 in FIG. 8. After the step S404, the application 147*a* specifies the scanned image ID and requests the display image managing part 1484 to generate the display image corresponding to the scanned image (S406).

In the steps S407-S409, like the steps S306-S308 in FIG. 10, the display image generating part 1482 generates the display image in the display image storage area 2332.

Subsequently, the display image managing part 1484 transfers the display image corresponding to the display image ID of the application A exclusive storage area 2334, which is an exclusive area for the application 147*a* as the origin of the scan request (S410). Therefore, the display image subjected to the transfer is deleted from the display image storage area 2332. Subsequently, the display image managing part 1484 notifies the application 147*a* of the display image ID of the transferred display image (S411). In this way, the application 147*a* is enabled to use the scanned image and the display image.

In a case where the process shown in FIG. 11 is performed for the application 147*b*, the display image is stored in the application B exclusive storage area 2335.

As descried above, according to the fourth embodiment of the present invention, the effects which are the same as those in the second embodiment can be obtained. Furthermore, since the scanned image and the display image are stored in an exclusive storage area corresponding to each of the applications 147, access from the other JSDK applications 147 is prevented. Accordingly, it is possible to further enhance the security.

Next, a fifth embodiment of the present invention is explained. In the fifth embodiment, the functional structure of the JSDK platform 148 is shown in FIG. 6, and the storage area for storing the image data is shown in FIG. 9.

Figure 12:
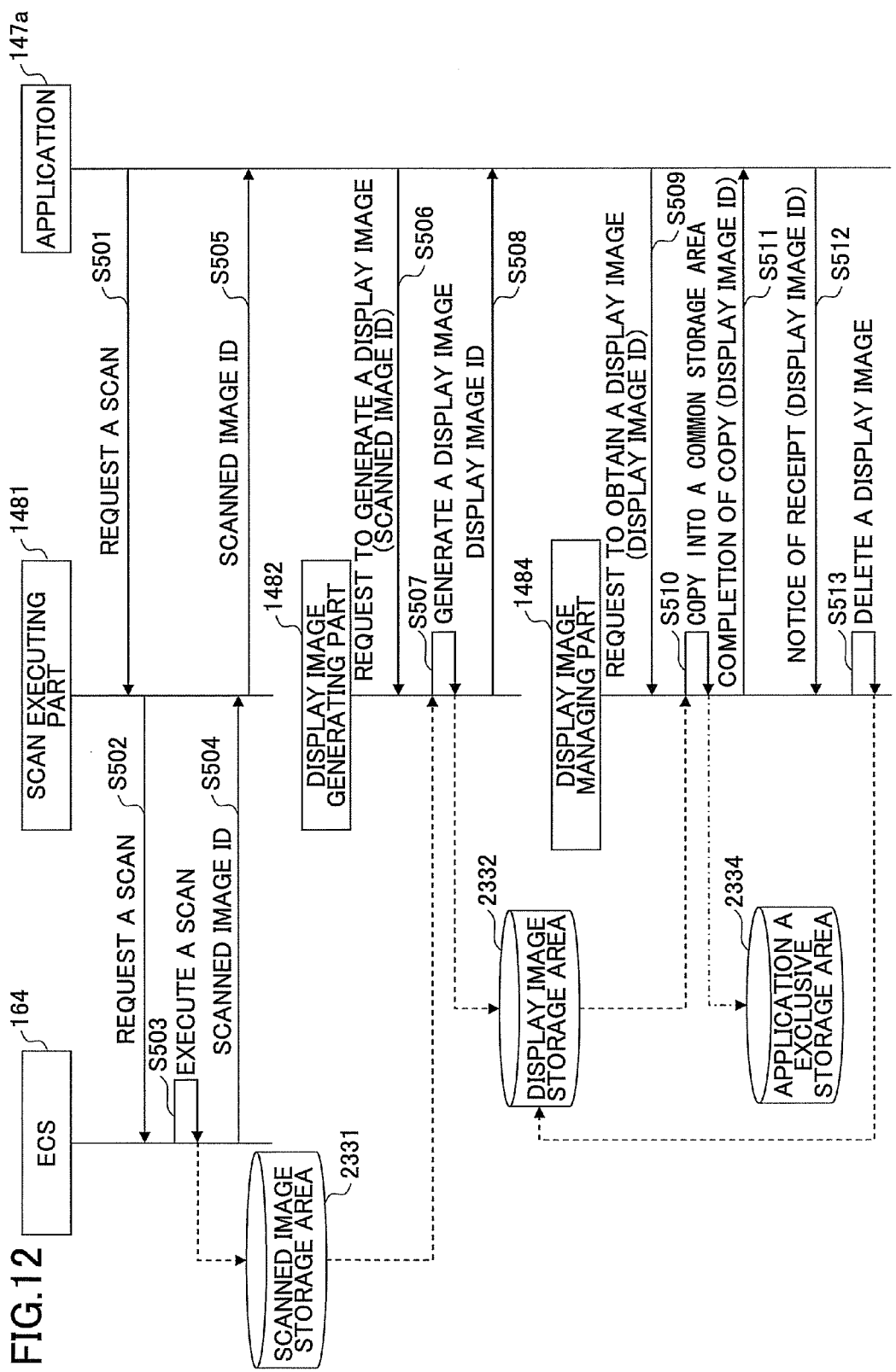
FIG. 12 is a drawing for showing procedures performed by a combination machine according to a fifth embodiment of the present invention.

FIG. 12 is a drawing for showing procedures performed by a combination machine according to the fifth embodiment of the present invention. In FIG. 12, the procedures to be performed are the same as those in FIG. 8 except that in the steps S510, the display image is copied into an exclusive storage area corresponding to each of the JSDK applications 147 (In FIG. 12, the application A exclusive storage area).

Therefore, according to the fifth embodiment of the present invention, the effects which are the same as those in the second embodiment can be obtained. Furthermore, since the scanned image and the display image are stored in an exclusive storage area corresponding to each of the applications 147, access from the other JSDK applications 147 is prevented. Accordingly, it is possible to further enhance the security.

Incidentally, the first embodiment may be combined with one of the second to the fifth embodiments. That is, it is possible that the JSDK platform 148 includes the display image display controlling part 1483, and that the display image is provided to the common storage area 2335 or the exclusive storage area for each of the applications 147.

According to at least one of the embodiments, the display image data of the scanned image data may be properly managed.

All examples and conditional language recited herein are intended for pedagogical purposes to aid the reader in understanding the principles of the invention and the concepts contributed by the inventor to furthering the art, and are to be construed as being without limitation to such specifically recited examples and conditions, nor does the organization of such examples in the specification relate to a showing of the superiority or inferiority of the invention. Although the embodiment of the present invention has been described in detail, it should be understood that the various changes, substitutions, and alterations could be made hereto without departing from the spirit and scope of the invention.

This patent application is based upon and claims the benefit of priority of Japanese Patent Application No. 2009-057011 filed on Mar. 10, 2009 the entire contents of which are incorporated herein by reference.

What is claimed is:

1. An image forming device having an image reading unit, an image data storage unit, a display data storage unit and a display unit, and performing a plurality of applications, the image forming device comprising:
   a scan controlling unit configured to instruct the image reading unit to read image data, and store the image data in the image data storage unit according to a request from a particular application among the plurality of the applications;
   a display data generating unit configured to generate a display data of the image data stored in the image data storage unit, and store the display data associated with an identifier of the particular application in the display image data storage unit according to the request from the particular application, said display image data storage unit being inaccessible from the particular application, said image data including identification data corresponding to at least one of the plurality of applications;
   a display controlling unit configured to display the display data in the display unit according to the request from the particular application; and
   a deleting unit configured to delete only the display data corresponding to the particular application from the display data storage unit based on a termination notice including the identification data of use of the display data generated by the particular application or the scan controlling unit,
   wherein the termination notice is automatically made based on a request to process the image data by one of the plurality of the applications, said request to process being input by a user, and
   the deletion unit automatically deletes the display data upon receiving the termination notice.

2. The image forming device as claimed in claim 1, wherein the deleting unit deletes the display data from the display data storage unit when a predetermined time elapses after the display controlling unit displays the display data.

3. The image forming device as claimed in claim 1, wherein the deleting unit deletes the display data from the display data storage unit when a predetermined time elapses after the display data is generated.

4. The image forming device as claimed in claim 1, further comprising:
   a common storage unit configured to store image data used by the plurality of the applications, and to be accessible from the plurality of the applications; and
   a copying unit configured to copy the display data stored in the display data storage unit into the common storage unit according to the request from the particular application,
   wherein the deleting unit deletes the display data copied into the common storage unit from the display data storage unit.

5. The image forming device as claimed in claim 1, further comprising:
   an exclusive storage unit configured to store image data managed by the particular application among the plurality of the applications, and to be exclusive for the particular application; and a copying unit configured to copy the display data stored in the display data storage unit into the exclusive storage unit according to the request from the particular application.

6. A method of managing data using an image forming device executing a plurality of applications and having an image reading unit, an image data storage unit, a display data storage unit, and a display unit, comprising the steps of:
   instructing, by a scan controlling unit provided to the image forming device, the image reading unit to read image data, and storing the image data in the image data storage unit according to a request from a particular application among the plurality of the applications;
   generating display data corresponding to the image data stored in the image data storage unit, and storing the display data associated with an identifier of the particular application in the display data storage unit according to the request from the particular application, said display data storage unit being inaccessible from the particular application, said image data including identification data corresponding to at least one of the plurality of applications;
   displaying the display data on the display unit according to the request from the particular application; and
   deleting only the display data corresponding to the particular application from the display data storage unit based on a termination notice including the identification data of use of the display data generated by the particular application or the scan controlling unit,
   wherein the termination notice is automatically made based on a request to process the image data by one of the plurality of the applications, said request to process being input by a user, and
   the deleting automatically deletes the display data upon receiving the termination notice.

7. The method of managing the data as claimed in claim 6, wherein the display data is deleted from the display data storage unit when a predetermined time elapses after the display unit displays the display data.

8. The method of managing the data as claimed in claim 6, wherein the display data is deleted from the display data storage unit when a predetermined time elapses after the display data is generated.

9. The method of managing the data as claimed in claim 6, further comprising:
   copying the display data stored in the display data storage unit into a common storage unit provided to the image forming device according to the request from the particular application, said common storage unit being accessible from the plurality of the applications,
   wherein the display data that is copied into the common storage unit is deleted from the display data storage unit in the deleting step.

10. The method of managing the data as claimed in claim 6, further comprising:
    copying the display data stored in the display data storage unit into an exclusive storage unit provided to the image forming device according to the request from the application, said exclusive storage unit storing image data managed by the particular application among the plurality of the applications, and being exclusive for the particular application.

11. A non-transitory computer readable medium storing a program for executing a method by an image forming device, said image forming device executing a plurality of applications and having an image reading unit, an image data storage unit, a display data storage unit, and a display unit, said method comprising the steps of:
    instructing, by a scan controlling unit provided to the image forming device, the image reading unit to read image data, and storing the image data in the image data storage unit according to a request from a particular application among the plurality of the applications;
    generating display data corresponding to the image data stored in the image data storage unit, and storing the display data associated with an identifier of the particular application in the display data storage unit according to the request from the particular application, said display data storage unit being inaccessible from the particular application, said image data including identification data corresponding to at least one of the plurality of applications;
    displaying the display data in the display unit according to the request from the particular application; and
    deleting only the display data corresponding to the particular application from the display data storage unit based on a termination notice including the identification data of use of the display data generated by the particular application or the scan controlling unit,
    wherein the termination notice is automatically made based on a request to process the image data by one of the plurality of the applications corresponding to the image data, said request to process being input by a user, and
    the deleting automatically deletes the display data upon receiving the termination notice.

12. The non-transitory computer readable medium as claimed in claim 11, wherein the display data is deleted from the display data storage unit when a predetermined time elapses after the display unit displays the display data.

13. The non-transitory computer readable medium as claimed in claim 11, wherein the display data is deleted from the display data storage unit when a predetermined time elapses after the display data is generated.

14. The non-transitory computer readable medium as claimed in claim 11, further comprising:
    copying the display data stored in the display data storage unit into a common storage unit provided to the image forming device according to the request from the particular application, said common storage unit being accessible from the plurality of the applications,
    wherein the display data copied into the common storage unit is deleted from the display data storage unit in the deleting step.

15. The non-transitory computer readable medium as claimed in claim 11, further comprising:
    copying the display data stored in the display data storage unit into an exclusive storage unit provided to the image forming device according to the request from the particular application, said exclusive storage unit storing image data managed by the particular application among the plurality of the applications, and being exclusive for the particular application.

16. The image forming device as claimed in claim 1, wherein the display data include image data for a preview image or a thumbnail of the image data read by the image reading unit.

17. The image forming device as claimed in claim 1, wherein the termination notice of use of the display data is generated by the particular application or the scan controlling unit upon receiving an instruction to send the image data read by the scan controlling unit.

18. The image forming device as claimed in claim 1, wherein the deleting unit automatically deletes the display data from the display data storage unit after receiving the request to process the image data by the one of the plurality of the applications corresponding to the image data.

19. The image forming device as claimed in claim 1, wherein the deletion unit automatically deletes the display data upon receiving the termination notice without a request from the user to delete the display data from the display data storage unit.

\* \* \* \* \*